United States Patent [19]
Kaneko et al.

[11] Patent Number: 5,418,040
[45] Date of Patent: May 23, 1995

[54] AUTOMOBILE FUEL TANK WITH DAMPER LAYER AND METHOD OF MANUFACTURING SUCH DAMPER LAYER

[75] Inventors: Mitsuo Kaneko; Kouzou Hannuki; Hiroyoshi Nozaki; Shigeo Kaibuki, all of Saitama, Japan

[73] Assignee: Honda Giken Kogyo Kabushiki Kaisha, Tokyo, Japan

[21] Appl. No.: 925,976

[22] Filed: Aug. 5, 1992

[30] Foreign Application Priority Data

Aug. 5, 1991 [JP] Japan .................................. 3-219217

[51] Int. Cl.$^6$ .............................................. B32B 9/00
[52] U.S. Cl. ..................................... 428/195; 428/35.8; 428/209; 428/290; 428/381; 428/457; 428/461; 422/239
[58] Field of Search ............... 428/461, 457, 209, 35.8, 428/416, 195, 381, 290; 427/239

[56] References Cited

U.S. PATENT DOCUMENTS 4,783,366 11/1988 Shimogo et al. .
5,063,098 11/1991 Niwa et al. ........................... 428/461

FOREIGN PATENT DOCUMENTS 1-24087 5/1981 Japan .
3-17552 3/1991 Japan .

Primary Examiner—Patrick J. Ryan
Assistant Examiner—Abraham Bahta
Attorney, Agent, or Firm—Weiner, Carrier & Burt; Joseph P. Carrier; William F. Esser

[57] ABSTRACT

A thermosetting damper material which is in a liquid phase at normal temperature is coated on a surface of an automobile fuel tank. Thereafter, the coated thermosetting damper material is heated to thermoset the thermosetting damper material into a damper layer on the surface of the automobile fuel tank. A paint layer may be coated on the surface of the automobile fuel tank over or under the damper layer.

27 Claims, 4 Drawing Sheets

AUTOMOBILE FUEL TANK WITH DAMPER LAYER AND METHOD OF MANUFACTURING SUCH DAMPER LAYER

BACKGROUND OF THE INVENTION

1. Field of the Invention

The present invention relates to an automobile fuel tank with a damper layer thereon, and a method of manufacturing such a damper layer.

2. Description of the Relevant Art

Some automobile fuel tanks have damper layers of rubber or the like bonded to their outer surface for protecting the tanks from shocks. One known damper layer is attached to cover the entire surface of a fuel tank to protect the same, as disclosed in Japanese laid-open utility model publication No. 61-17163, for example.

Generally, however, damper layers are attached to only local regions of the paint-coated outer surface of a fuel tank which tend to be brought into abrasive or hitting contact with an automobile body. Such damper layers attached to local fuel tank surface regions may comprise rubber sheets that are bonded to the fuel tank surface by a subsequently applied adhesive or damper sheets that are bonded to the fuel tank surface by adhesive layers carried on the respective damper sheets. When the damper sheets are to be bonded, peel-off liner sheets are peeled off the adhesive layers to allow the adhesive layers to be applied to the fuel tank surface. When rubber sheets are bonded to the fuel tank surface, the entire attaching process has to be carried out manually because the positions of the rubber sheets need to be varied depending on the shape and type of the fuel tank. Consequently, the attaching process is not highly efficient, and hence the rate of production of fuel tanks with damper layers is poor.

According to still another damper layer design as disclosed in Japanese laid-open utility model publication No. 61-78727 or Japanese laid-open patent publications Nos. 62-204029 and 1-199030, a liquid damper material is coated on the surface of a fuel tank and subsequently allowed to set into a damper layer. In each of these publications, the liquid damper material is composed of a high-polymer viscous substance of synthetic rubber or natural rubber, a softener of vegetable oil or fatty oil, a tackifier of xylene, phenol, or the like, and either elastic particles of natural rubber, nitrile rubber, or the like, or a thermoplastic elastomer such as thermoplastic polyurethane or the like. In use, the liquid damper material is heated up to 140° C.~170° C., and applied as a hot melt to a fuel tank surface. The liquid damper material can quickly be applied as a hot melt to the fuel tank surface through a coating nozzle of a coating apparatus without manual intervention. However, inasmuch as the overall hot melt supply line leading up to the coating nozzle of the coating apparatus must be controlled in temperature, the coating nozzle is complex and expensive.

SUMMARY OF THE INVENTION

It is an object of the present invention to provide a method of manufacturing a damper layer on an automobile fuel tank highly efficiently with a relatively simple apparatus.

Another object of the present invention is to provide an automobile fuel tank with a damper layer which can be manufactured by such a method.

According to the present invention, there is provided a method of manufacturing a damper layer on a surface of an automobile fuel tank, comprising the steps of coating a thermosetting damper material which is in a liquid phase at normal or ambient temperature on a surface of an automobile fuel tank, and heating the coated thermosetting damper material to thermoset the thermosetting damper material into a damper layer on the surface of the automobile fuel tank. The step of thermosetting may comprise the step of quickly heating the coated thermosetting damper material with near- or far-infrared radiation.

According to the present invention, there is also provided a method of manufacturing a damper layer on a surface of an automobile fuel tank, comprising the steps of coating a thermosetting damper material which is in a liquid phase at normal temperature on a surface of an automobile fuel tank, coating a paint layer on the surface of the automobile fuel tank over the coated thermosetting damper material, and heating the coated paint layer and the coated thermosetting damper material to dry the coated paint layer and also to thermoset the thermosetting damper material into a damper layer on the surface of the automobile fuel tank. The step of heating may comprise the step of heating the coated paint layer and the coated thermosetting damper material in a baking furnace.

According to the present invention, there is also provided a method of manufacturing a damper layer on a surface of an automobile fuel tank, comprising the steps of drying a paint layer coated on a surface of the automobile fuel tank in a baking furnace, immediately after removing the automobile fuel tank, coating a thermosetting damper material which is in a liquid phase at normal temperature on the surface of the automobile fuel tank, and heating the coated thermosetting damper material with the thermal inertia of the automobile fuel tank to thermoset the thermosetting damper material into a damper layer on the surface of the automobile fuel tank.

According to the present invention, an automobile fuel tank has a damper layer on an outer surface thereof, the damper layer being made of a thermosetting damper material which is in a liquid phase at normal temperature and thermosets with heat. The automobile fuel tank may further include a paint layer coated on the outer surface thereof over or under the damper layer.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
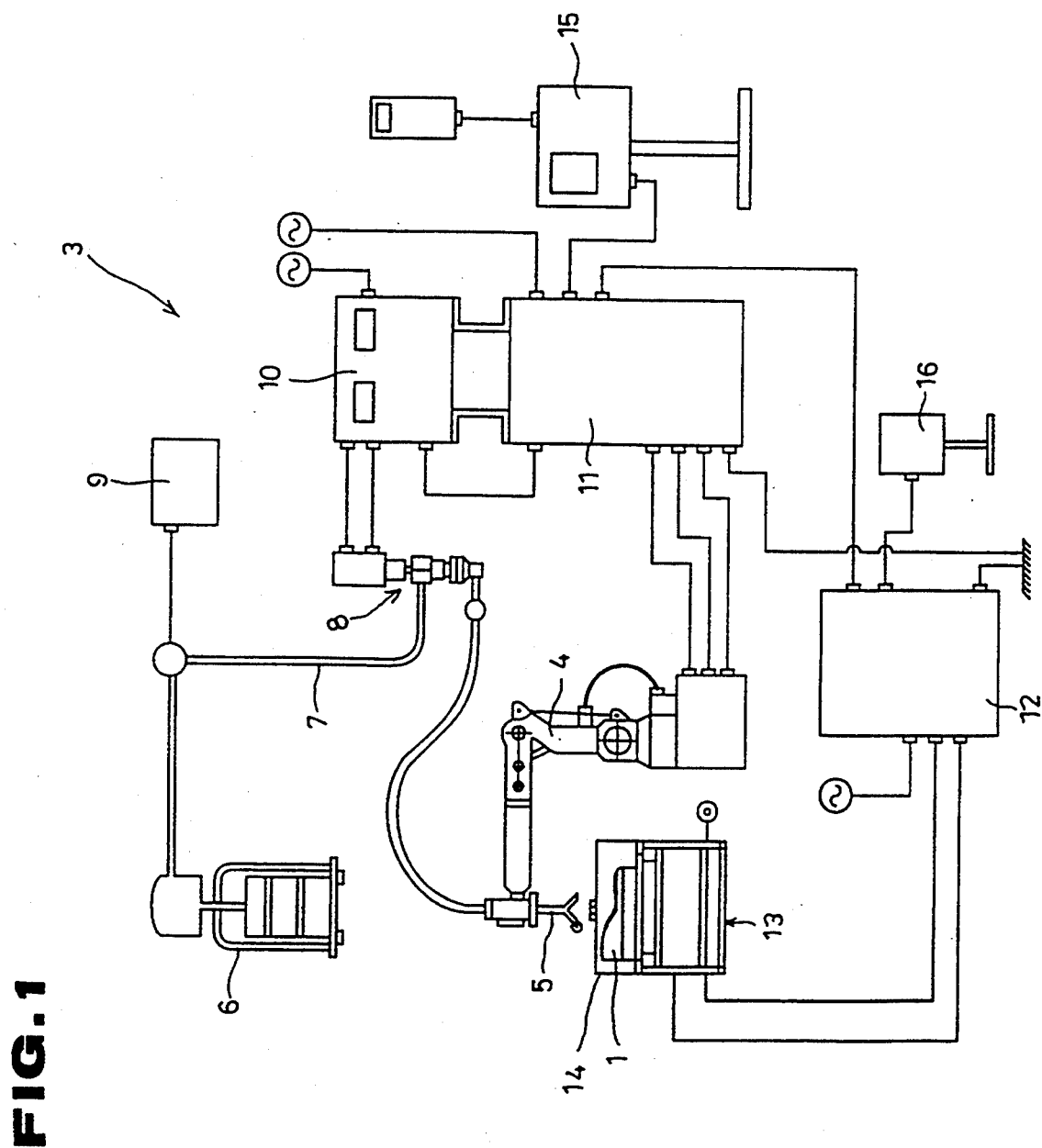
FIG. 1 is a schematic diagram of a coating apparatus used to carry out a method according to the present invention.

As shown in FIG. 1, a coating apparatus, generally designated by the reference numeral 3, for carrying out a method according to the present invention includes a coating robot 4 having a coating nozzle 5 on the distal end of a robot arm. The coating apparatus 3 also has a damper material supply unit 6 for supplying a liquid-phase damper material to the coating nozzle 5 through a supply line 7 which has a constant-rate feed unit 8. The damper material supply unit 6 is controlled by a supply unit controller 9. The constant-rate feed unit 8 is controlled by a feed unit controller 10. The coating robot 4 is controlled by a robot controller 11 which in turn is controlled by a master controller 12. A robot control panel 15 is connected to the robot controller 11, and a master control panel 16 is connected to the master controller 12.

While the coating apparatus 3 is in operation, a liquid-phase damper material 2 supplied from the damper material supply unit 6 is applied by the coating nozzle 5 to an outer surface of an automobile fuel tank 1 that is positioned by a fuel tank positioner 13 which is controlled by the master controller 12. After the liquid-phase damper material has been applied to the outer surface of the automobile fuel tank 1, a drying unit 14 which preferably comprises a heater for emitting near-infrared radiation is positioned above the automobile fuel tank 1, and energized to apply near-infrared radiation to the coated liquid-phase damper material to set or harden the same into a solid damper material.

Figure 2:
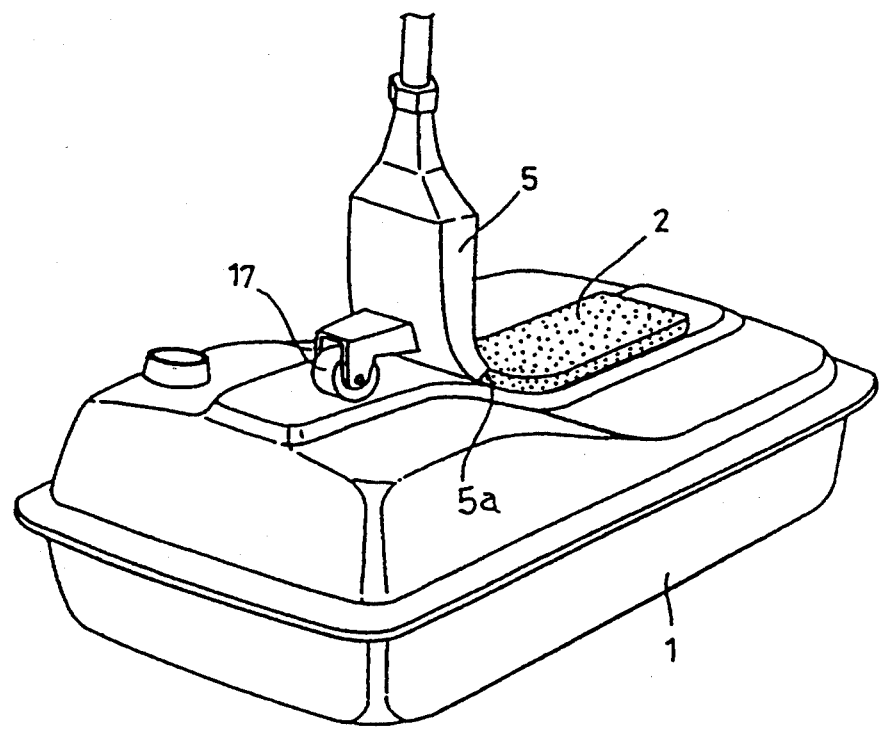
FIG. 2 is a perspective view showing the manner in which a liquid-phase thermosetting damper material is applied to a fuel tank.
Figure 3:
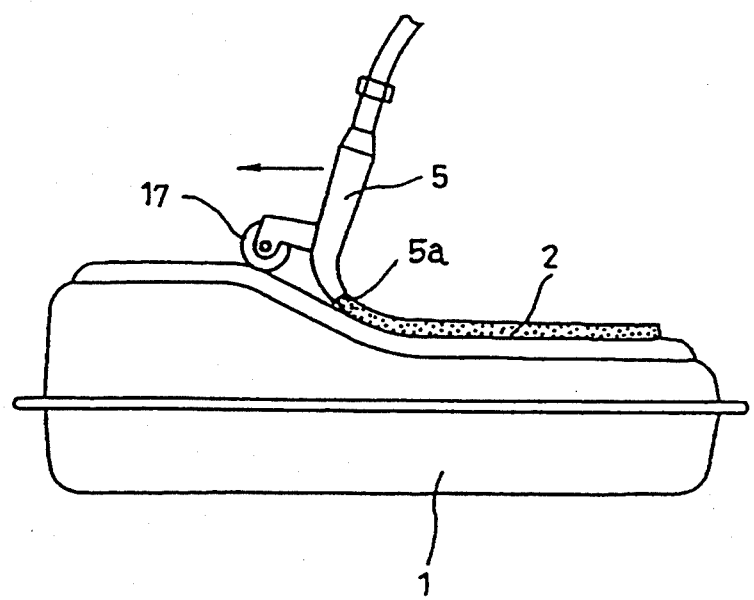
FIG. 3 is a side elevational view of the fuel tank with the thermosetting damper material being applied.

FIGS. 2 and 3 show the automobile fuel tank 1 at enlarged scale. The automobile fuel tank 1, which is usually made of a thin steel sheet, is positioned beneath a rear floor of an automobile body or within a trunk compartment thereof when mounted on the automobile body. At least one damper layer 2 is coated on the outer surface of the fuel tank 1 in a local region where it tends to come into abrasive contact with or to be hit and shocked by the automobile body upon a collision or other automobile accidents. The coated damper layer 2 is capable of effectively dampening the energy that is applied to the fuel tank 1 by the automobile body when the fuel tank 1 is forcibly contacted by the automobile body. Therefore, the damper layer can protect the fuel tank 1 from damage, so that the fuel stored in the fuel tank 1 is prevented from leaking out.

According to the present invention, the damper material that is applied in a liquid phase to the fuel tank 1 comprises a thermosetting damper material which is in a liquid phase at normal temperature and which can be set when heated up to a predetermined temperature. The damper material should preferably be set within a short period of time when heated quickly up to a predetermined temperature, and should best provide, as a hardened damper layer, the same functions as those of a conventional cushioning rubber layer, e.g., a chloroprene rubber sheet having a thickness of 1.5 mm with an acrylic adhesive layer, manufactured by Asahi Corp.

Table below shows the composition of a liquid-phase sample synthetic rubber material which meets the above requirements for the damper material.

| SAMPLE MATERIAL (MODIFIED RUBBER) | |
|---|---|
| Composition | wt % |
| Synthetic rubber | 10 |
| Vinyl chloride | 20 |
| Plasticizer | 27 |
| Filler | 30 |
| Stabilzer | 5 |
| Tackifier | 8 |
| Total | 100 |

More specifically, to 10 wt % of synthetic rubber such as acrylonitrile butadiene rubber (NBR), styrene butadiene rubber (SBR), or the like, there are added 20 wt % of vinyl chloride for making the rubber material thermosetting, 27 wt % of a plasticizing for plasticize the rubber material, 30 wt % of a filler such as calcium carbonate for preventing the rubber material from becoming porous and for increasing the mechanical strength and durability of the rubber material, 5 wt % of a stabilizer, and 8 wt % of a tackifier for making the rubber material sticky to oily surfaces to increase the adhesiveness of the rubber material to a fuel tank surface.

The synthetic rubber material of the above composition is of a high degree of viscosity ranging from 1,500,000 to 3,000,000 cps and contains no solvent. The synthetic rubber material is effective to avoid various difficulties which would otherwise occur if the composition contained an organic solvent and was heated quickly, thus producing an elastic damper layer within a short period of time. Specifically, the amount of thermal energy to be applied per unit time to the synthetic rubber material should be increased to a relatively high value in order to thermoset the synthetic rubber material in a short period of time. If the applied thermal energy were increased and the composition contained an organic solvent, however, the organic solvent would foam in the rubber material, the molecular structure of the rubber material would change due to a mismatch between the reaction speed and cooling speed of the resins, and the applied rubber material would sag or run owing to a rapid change in the viscosity. The synthetic rubber material of the above composition is however free of these shortcomings.

The liquid-phase sample synthetic rubber material described above can be thermoset at 140° C. in a short period of time ranging from about 90 seconds to 120 seconds upon exposure to a high-density energy such as near-infrared radiation or far-infrared radiation.

A damper layer produced when the liquid-phase sample synthetic rubber material is coated and thermoset has a tensile strength of 42.9 kg/cm$^2$, which sufficiently meets the requirement for the mechanical strength of such a damper layer, and also has a shear bonding strength (resistance to a shearing stress along the damper layer) of about 10 kg/cm$^2$, which is much higher than the shear bonding strength of the conventional damper layers.

The produced damper layer also meets other requirements for permanent set (%), degree of elongation (%), aging resistances including rates of change of tensile strength, elongation, and hardness.

A process of forming a damper layer on an automobile fuel tank will now be described in detail with reference to FIGS. 1 through 3.

Two fuel tank shells (not shown) pressed from thin sheet steel are seam-welded into an automobile fuel tank 1, and the automobile fuel tank 1 is then coated with a paint layer and then dried in a baking furnace.

Figure 4:
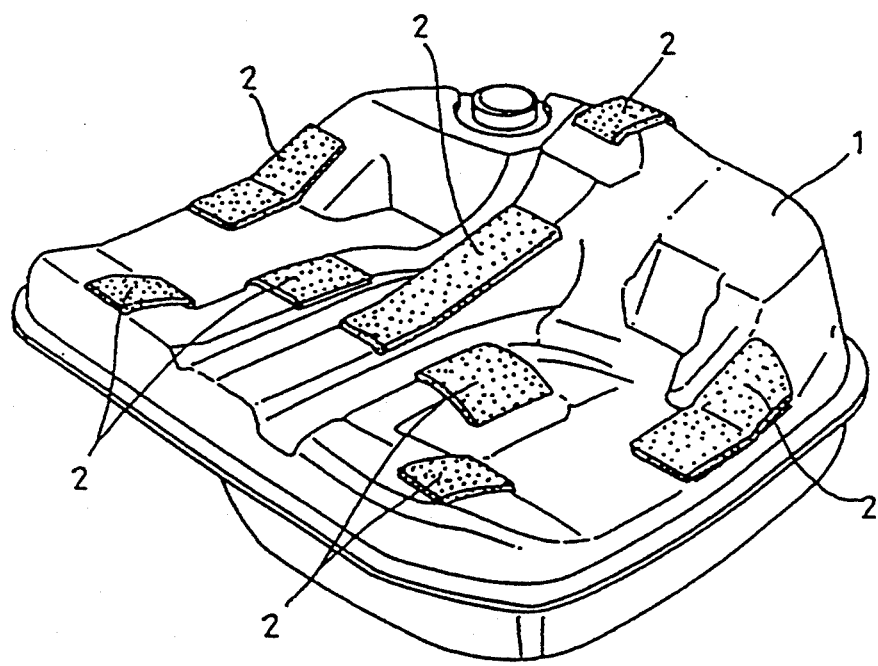
FIG. 4 is a perspective view showing another pattern in which a thermosetting damper material is applied to a fuel tank.

After the paint coating has been dried, the fuel tank 1 is placed on the fuel tank positioner 13 (see FIG. 1). Then, as shown in FIGS. 2 and 3, a liquid-phase damper material 2 is coated on a local region of the outer surface of the fuel tank 1 by the coating nozzle 5 of the coating robot 4. At this time, the coating robot 4 and nozzle 5 are controlled by the robot controller 11 (FIG. 1) to move in a predetermined pattern depending on the type of the fuel tank 1. For example, the coating nozzle 5 may be controlled to coat the liquid-phase coating material 2 in various regions of the outer surface of the fuel tank 1, as shown in FIG. 4.

As shown in FIGS. 2 and 3, the coating nozzle 5 is of a flat elongate shape having a lower discharge slot 5a for discharging the liquid-phase damper material 2. The coating nozzle 5 has a guide roller 17 rotatably mounted on its leading side and held in rolling contact with the outer surface of the fuel tank 1. When the coating nozzle 5 travels over the fuel tank 1, the coating nozzle 5 is guided by the guide roller 17 which simultaneously automatically adjusts the height of the coating nozzle 5 with respect to the fuel tank 1. The guide roller 17 may however be dispensed with, and the height adjustment of the coating nozzle 5 may be carried out by the coating robot 4.

The guide roller 17 is positioned centrally in the transverse direction of the coating nozzle 5. Therefore, if the liquid-phase damper material 2 is to be coated on the fuel tank 1 successively along parallel paths thereover, the guide roller 17 is prevented from running over coated paths.

Figure 5:
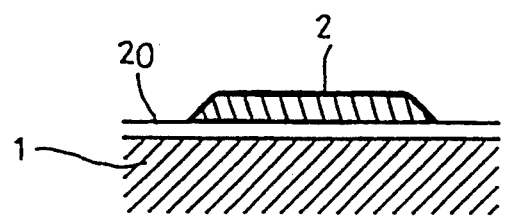
FIG. 5 is a fragmentary cross-sectional view of a fuel tank with a liquid-phase thermosetting damper material applied over a coating film.

FIG. 5 shows the fuel tank 1 with the liquid-phase damper material 2 coated over the paint layer, denoted at 20.

Figure 6:
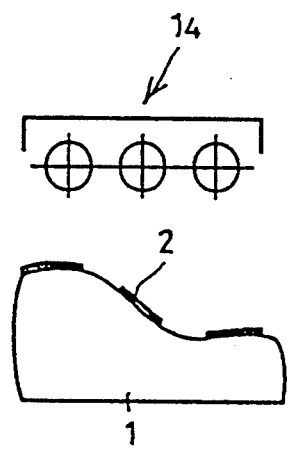
FIG. 6 is a side elevational view showing the manner in which the liquid-phase thermosetting damper material applied to the fuel tank is dried.

As shown in FIG. 6, the drying unit 14 for emitting near-infrared radiation is positioned above the fuel tank 1, and energized to apply near-infrared radiation to the coated liquid-phase damper material 2 to set or harden the same into a solid damper layer at about 140° C. for about 90 seconds.

According to the above process, the damper layer can be manufactured inexpensively, and is environmentally safe as it contains no solvent. The process is quick because the liquid-phase damper material 2 is thermoset within a short period of time.

The heater of the drying unit 14 may emit far-infrared radiation instead of near-infrared radiation.

Figure 7:
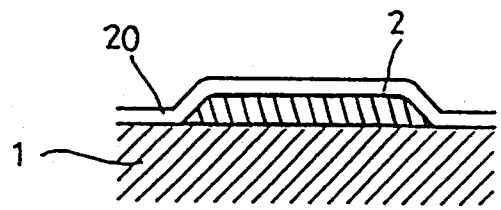
FIG. 7 is a fragmentary cross-sectional view of a fuel tank with a liquid-phase thermosetting damper material applied under a coating film.

FIG. 7 shows another process for applying a liquid-phase damper material 2 to an automobile fuel tank 1. In FIG. 7, the liquid-phase damper material 2 is first coated on the bare surface of the fuel tank 1, and then a paint coating 20 is applied to the fuel tank 1 over the coated damper material 2. Since the tackifier is contained in the damper material 1, the damper material 2 sticks well to the outer surface of the fuel tank 1 even if it is oily.

After the paint coating 20 has been applied, the coated liquid-phase damper material 2 is thermoset at the same time that the paint coating 20 is dried in a baking furnace. Therefore, the coated liquid-phase damper material 2 can be thermoset in the baking furnace, and no dedicated drying unit is necessary for thermosetting the coated liquid-phase damper material 2.

The liquid-phase damper material 2 may be coated after the outer surface of the fuel tank 1 has been degreased and washed prior to the application of the paint coating 20.

Another process of forming a damper layer on an automobile fuel tank will be described below.

According to this process, a liquid-phase damper material 2 is coated to an automobile fuel tank 1 immediately after the fuel tank 1 is unloaded from a baking furnace in which a coated paint layer on the fuel tank 1 is dried. Immediately after the fuel tank 1 is discharged from the baking furnace, the temperature of the outer surface of the fuel tank 1 ranges from 100° C. to 200° C. When the liquid-phase damper material 2 is coated on the the outer surface of the fuel tank 1 whose temperature ranges from 100° C. to 200° C., the coated liquid-phase damper material 2 is automatically thermoset by the thermal inertia or remaining heat of the outer surface of the fuel tank 1, thereby producing a solid damper layer. Since the outer surface of the fuel tank 1 is substantially free of dust, dirt, and other foreign matter immediately after it is taken out of the baking furnace, the liquid-phase damper material 2 sticks well to the fuel tank 1.

The thermosetting damper material is not limited to the composition described above, but may comprise a one-can or single component urethane material, for example.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing a damper layer on a surface of an automobile fuel tank, comprising the steps of:
    coating a thermosetting damper material which is in a liquid phase at normal temperature on a surface of an automobile fuel tank; and
    heating the coated thermosetting damper material to thermoset the thermosetting damper material into a damper layer on the surface of the automobile fuel tank.

2. A method according to claim 1, wherein said heating step is achieved by quickly heating said coated thermosetting damper material with near- or far-infrared radiation.

3. A method of manufacturing a damper layer on a surface of an automobile fuel tank, comprising the steps of:
    coating a thermosetting damper material which is in a liquid phase at normal temperature on a surface of an automobile fuel tank;
    coating a paint layer on said surface of the automobile fuel tank over the coated thermosetting damper material; and
    heating the coated paint layer and the coated thermosetting damper material to dry said coated paint layer and also to thermoset the thermosetting damper material into a damper layer on the surface of the automobile fuel tank.

4. A method according to claim 3, wherein said step of heating comprises the step of heating the coated paint layer and the coated thermosetting damper material in a baking furnace.

5. A method of manufacturing a damper layer on a surface of an automobile fuel tank, comprising the steps of:
   drying a paint layer coated on a surface of the automobile fuel tank in a baking furnace;
   immediately after removing the automobile fuel tank, coating a thermosetting damper material which is in a liquid phase at normal temperature on the surface of said automobile fuel tank; and
   heating the coated thermosetting damper material with a thermal inertia of the automobile fuel tank to thermoset the thermosetting damper material into a damper layer on the surface of the automobile fuel tank.

6. An automobile fuel tank having a damper layer on an outer surface thereof, said damper layer being made of a thermosetting damper material which is in a liquid phase at normal temperature and thermoset with heat.

7. An automobile fuel tank according to claim 6, further including a paint layer coated on the outer surface thereof over said damper layer.

8. An automobile fuel tank according to claim 6, further including a paint layer coated on the outer surface thereof under said damper layer.

9. A method according to claim 1, wherein said heating step is achieved by applying the thermosetting damper material to the surface of the fuel tank immediately after the fuel tank has been removed from a baking furnace such that a thermal inertia of the fuel tank thermosets the damper material.

10. A method according to claim 1, wherein said thermosetting damper material has a high degree of viscosity ranging from 1,500,000 to 3,000,000 cps and contains no solvent.

11. An automobile fuel tank according to claim 6, wherein said thermosetting damper material has a high degree of viscosity ranging from 1,500,000 to 3,000,000 cps and contains no solvent.

12. An automobile fuel tank according to claim 6, wherein said thermosetting material is adapted to rapidly thermoset upon exposure to high-density radiant energy.

13. An automobile fuel tank according to claim 12, wherein said thermosetting damper material is adapted to thermoset within approximately two minutes upon exposure to high-density radiation energy.

14. An automobile fuel tank according to claim 6, wherein said damper layer is adapted to thermoset upon exposure to near-infrared radiation or far-infrared radiation.

15. An automobile fuel tank according to claim 6, wherein said damper layer has a shear bonding strength of substantially ten kilograms per square centimeter.

16. An automobile fuel tank according to claim 6, wherein said thermosetting damper material contains no solvent when in said liquid state.

17. An automobile fuel tank according to claim 6, wherein said thermosetting damper material contains a tackifier for enhancing adherence to said outer surface of the fuel tank.

18. An automobile fuel tank according to claim 7, wherein said paint layer is coated over said damper layer before said damper layer is thermoset, and said damper layer is thermoset concurrently as said paint layer is baked.

19. An automobile fuel tank according to claim 6, wherein said thermosetting damper material is adapted to be thermoset by a thermal inertia of said fuel tank when said fuel tank is at a temperature in a range of 100° C. to 200° C.

20. A method according to claim 1, wherein said thermosetting damper material comprises a mixture including rubber, a thermosetting resin, a plasticizer, a strength-increasing filler, a stabilizer and a takifier.

21. A method according to claim 1, wherein said thermosetting damper material comprises a urethane material.

22. A method according to claim 3, wherein said thermosetting damper material comprises a mixture including rubber, a thermosetting resin, a plasticizer, a strength-increasing filler, a stabilizer and a takifier.

23. A method according to claim 3, wherein said thermosetting damper material comprises a urethane material.

24. A method according to claim 5, wherein said thermosetting damper material comprises a mixture including rubber, a thermosetting resin, a plasticizer, a strength-increasing filler, a stabilizer and a takifier.

25. A method according to claim 5, wherein said thermosetting damper material comprises a urethane material.

26. A fuel tank according to claim 6, wherein said thermosetting damper material comprises a mixture including rubber, a thermosetting resin, a plasticizer, a strength-increasing filler, a stabilizer and a takifier.

27. A fuel tank according to claim 6, wherein said thermosetting damper material comprises a urethane material.

* * * * *

UNITED STATES PATENT AND TRADEMARK OFFICE
CERTIFICATE OF CORRECTION

PATENT NO.  : 5,418,040
DATED       : 23 May 1995
INVENTOR(S) : Mitsuo Kaneko, Kouzou Hannuki,
              Hiroyoshi Nozaki, Shigeo Kaibuki It is certified that error appears in the above-indentified patent and that said Letters Patent is hereby corrected as shown below:

Column 2, line 50, after "thereof" insert --either--.
Column 4, in the table between lines 10 and 15,
              change "Stabilzer" to --Stabilizer--;
          line 22, change "27 wt % of a plasticizing for plasticize"
              to --27 wt % of a plasticizer for plasticizing--.
Column 6, line 20, delete "the" (first occurrence only).
Column 8, line 28, change "takifier" to --tackifier--;
          line 35, change "takifier" to --tackifier--;
          line 42, change "takifier" to --tackifier--;
          line 49, change "takifier" to --tackifier--.

Signed and Sealed this

Fifth Day of December, 1995

Attest:

BRUCE LEHMAN

Attesting Officer    Commissioner of Patents and Trademarks